Nov. 26, 1940.   H. J. SHAMES   2,222,882
AIR PURIFYING COMPOSITION AND PROCESS THEREFOR
Filed May 14, 1940   2 Sheets—Sheet 1

Inventor
Harold J. Shames.
By Amro, Theiss, Olson & Muhlenburger
Attys.

Nov. 26, 1940.   H. J. SHAMES   2,222,882
AIR PURIFYING COMPOSITION AND PROCESS THEREFOR
Filed May 14, 1940   2 Sheets-Sheet 2

Inventor
Harold J. Shames
By Amso, Thies, Olson & Muchlenberger
Attys

Patented Nov. 26, 1940

2,222,882

UNITED STATES PATENT OFFICE 2,222,882

AIR PURIFYING COMPOSITION AND PROCESS THEREFOR

Harold Jay Shames, Chicago, Ill.

Application May 14, 1940, Serial No. 335,179

6 Claims. (Cl. 252—261)

This application is a continuation in part of my pending applications Serial No. 144,543, filed May 24, 1937, and Serial No. 213,322, filed June 13, 1938.

The present invention relates to a novel composition and method for the adsorption of various gases and vapors, and more particularly to an improved adsorption medium and process for removing objectionable odors from air.

One of the objects of the present invention is to provide a new and highly efficient gas-adsorption medium which may be readily regenerated upon exhaustion.

A more particular object is to provide a new and improved method and agent for the removal of objectionable odors from foul, polluted, impure, or odor-laden air.

A further object is a readily regenerated, highly efficient composition for the adsorptive removal of odors from air contained in confined spaces such as refrigerated chambers for foodstuffs, air-conditioned rooms, and the like.

Another object is to provide a readily regeneratable, efficient deodorizer unit for household refrigerators, which adsorbs odors which would otherwise contaminate foods or products other than those from which the odors emanate.

A still further object is to provide an improved method and medium for air-conditioning dwellings, rooms, Pullman cars, theaters, battleships, defensive fortifications, and the like, whereby objectionable odors may be removed from the foul, polluted, odor-laden, poisoned, or otherwise impure air being circulated therein.

Additional objects will become apparent as the invention is hereinafter more fully described.

The foregoing and other objects may be accomplished in accordance with the present invention, one aspect of which includes a new and highly efficient process and medium for the adsorption of malodorous gases and vapors.

My improved gas-adsorption medium, characterized in terms of its fundamental properties, comprises a highly porous, substantially snow-white innoxious salt which is capable of physically adsorbing odors or other impurities from air in contact therewith, and capable of being regenerated when exhausted by the passage therethrough of air which is free from the objectionable odors or impurities. Characterized in chemical terms, the gas adsorbing composition in accordance with my invention comprises a precipitated, uncalcined form of basic tricalcium phosphate substantially composed of hydroxyapatite, which has the formula:

$$3Ca_3(PO_4)_2 \cdot Ca(OH)_2$$

Hydroxyapatite is sometimes called "hydroxylapatite" (Hodge, J. Ind. & Eng. Chem., Anal. ed. vol. 10, page 159, 1938), "calcium hydroxyphosphate" (Mellor, vol. III, pages 864–6), or "calcium hydroxyhexaphosphate" (idem). However, the first mentioned term is the name most commonly used.

The structure of hydroxyapatite has not been precisely determined but it is sometimes represented as follows:

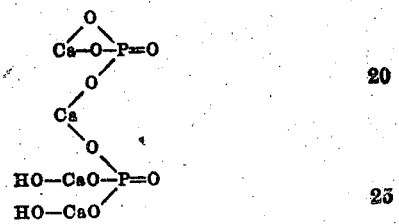

Commercial grades of hydroxyapatite are usually called "tertiary calcium phosphate," or "basic tricalcium phosphate." These commercial grades, of course, generally contain various impurities, the relative amounts of which depend in part upon the procedure employed in manufacturing the product. I have found, however, that such impurities, although substantially inert as far as the adsorption of gases is concerned, do not materially detract from the adsorptive capacity of the product.

The commercial tertiary calcium phosphates are composed substantially of hydroxyapatite with more or less adsorbed phosphate ions, the composition depending upon the mode of precipitation, the pH value, the type and proportion of impurities present in the raw materials from which the product is manufactured, and other factors. Moreover, when prepared by the usual procedure (vide infra) hydroxyapatite appears to be in stable equilibrium with normal calcium phosphate (Hodge, supra), for which reason the commercial grades practically all contain a certain proportion of the normal phosphate as a by-product.

A very satisfactory commercial grade of tertiary calcium phosphate which is presently being sold by The Victor Chemical Works under the trade designation "T C P," is prepared by neutralizing a milk of lime slurry containing approximately 6% CaO, with 12° Baumé gravity strength phosphoric acid, to a pH value of approximately 6.10 to 7.0 at a temperature of approximately 60° C. The precipitate is separated and dried for 24 hours in a steam oven at about 190° F. The dried product is then milled to the desired granular size.

A typical sample of one brand of commercial tertiary calcium phosphate had the following calculated composition as determined by analysis:

Table I

| | Per cent |
|---|---|
| $3Ca_3(PO_4)_2Ca(OH)_2$ | 78.90 |
| $Ca_3(PO_4)_2$ | 12.65 |
| $CaH_4(PO_4)_2.H_2O$ | 0.80 |
| $Fe,AlPO_4$ | 0.12 |
| $MgSO_4$ | 0.18 |
| $CaSO_4$ | 0.14 |
| $CaCO_3$ | 1.14 |
| Free $H_2O$ | 2.25 |
| Loss on ignition (excluding free $H_2O$) | 2.26 |
| Other impurities | 1.56 |
| Total | 100.00 |

When total phosphorus is calculated as $P_2O_5$ and total calcium as CaO, commercial tertiary calcium phosphates generally give the following typical analytical results:

| | Per cent |
|---|---|
| Moisture | 1.5 to 2.0 |
| Calcium oxide | 49.5 to 50.5 |
| Phosphorus pentoxide | 39.0 to 39.7 |

The variations in composition are, of course, due to variations in the nature and proportion of the impurities present in the commercial grade, depending on the factors indicated above. The commercial grades of basic tricalcium phosphate contain a ratio of CaO to $P_2O_5$ ranging approximately from 3.25 to 3.33, the ratio likewise depending upon the factors mentioned.

Various other commercial grades of tertiary calcium phosphate are available on the market, all of which are satisfactory, provided the hydroxyapatite content thereof is at least 70%.

The adsorption agent in accordance with my invention is preferably used in coarse or granular form, in order to permit the ready passage of air therethrough. Thus, the particle size may, for example, be such that the material passes a 4-mesh standard Tyler screen, and is retained on an 80-mesh standard screen. Preferably, however, I employ particles which pass through a 10-mesh screen but are retained on a 20-mesh screen.

I have found that this precipitated, uncalcined form of basic tricalcium phosphate possesses an extraordinary and hitherto unsuspected capacity for physically adsorbing certain vapors and gases, particularly those which are objectionable as odors. I have further determined that this material is especially effective in deodorizing the atmosphere in refrigerators, freight cars, cold storage plants, delivery trucks, clothes closets, humidors, diaper boxes, and similar confined spaces; and also in deodorizing the air which is circulated in air-conditioning systems such as those employed in Pullman cars, busses, street cars, theaters, stores, dwellings, and the like. Upon exhaustion, the regeneration of the material is easily accomplished merely by exposing the exhausted composition to fresh air for several hours, or preferably, by passing a current of air which is free from objectionable odors through the material.

In order to illustrate more clearly certain aspects of the present invention, reference is made to the accompanying figures of the drawings. It should be understood, however, that this is done solely by way of example, and is not to be considered as a limitation upon the spirit and scope of my invention.

Referring generally to the drawings.

Figure 1:
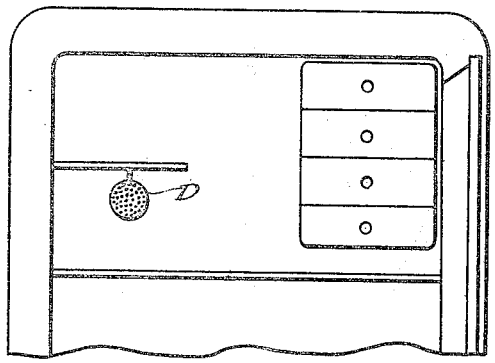
Figure 1 is a front view of the upper portion of a household mechanical refrigerator containing a deodorizing unit in accordance with the present invention.
Figure 2:
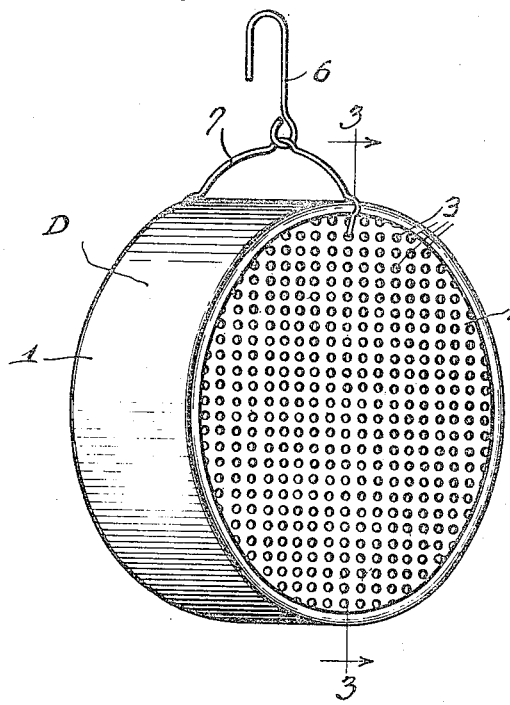
Fig. 2 is a perspective view of the deodorizer unit for household use.
Figure 3:
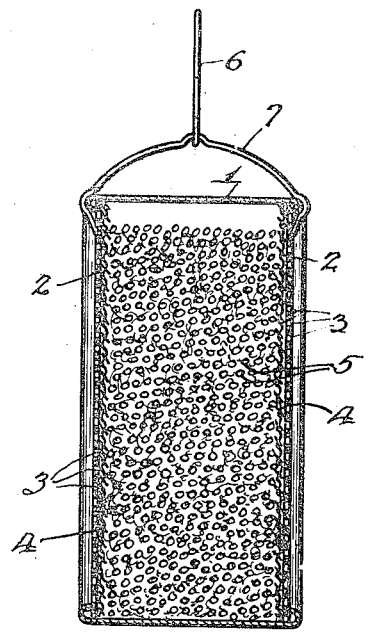
Fig. 3 is a cross-sectional view taken on the line 3—3 of the unit shown in Fig. 2.

Referring now particularly to Figs. 1, 2, and 3, the household refrigerator-deodorizer unit D illustrated therein comprises a container 1, which may preferably be constructed of a suitable moisture-resistant material such as plastic; for example, Celluloid, or "Lumarith." The two ends 2 of the container are constructed of water-resistant material such as Celluloid—or "Lumarith"—provided with a plurality of perforations 3, 100 holes per square inch being satisfactory. Adjacent the inner face of each Celluloid end 2 is a foraminous structure such as a loosely woven gauze disc 4, which prevents the contents of the container from passing through the holes in the end portions. The container is filled with the above mentioned precipitated, uncalcined tricalcium phosphate 5, of particle size, for example, such that the material passes through a 10-mesh screen but is retained on a 20-mesh screen. A suitable hook 6 is attached to the hook-support 7, so that the unit may be conveniently hung in the refrigerator.

The unit illustrated in Figs. 1 to 3 is suitable for small size refrigerators such as the usual household ice box or mechanical refrigerator having a maximum content of about nine cubic feet. It is highly efficient in adsorbing odors of foodstuffs such as fish, onions, sauerkraut, vegetables, meats, smoked meats, and even the odors produced by such highly odorous foods as cheeses; for example, Liederkranz cheese and the like. If desired, the composition may also be used to adsorb odors which are not usually associated with or produced by foods, such as sulfur dioxide, hydrogen sulfide, and the like. The composition may also be employed in gas masks and the like.

For larger refrigerating units such as the reach-in or walk-in types employed in food shops, a number of these units may be employed, or if desired, larger units of the same general character may be constructed. If preferred, loose muslin bags containing a larger quantity of precipitated, uncalcined tricalcium phosphate may be used for this purpose. For delivery trucks, units of the latter type have been found convenient, the bag being suspended from the roof or ceiling by suitable means such as a drapery hook.

In the case of large confined spaces such as refrigerated railway cars, the material may be spread upon the floor or placed in an exposed condition upon shelves or on a false ceiling over the goods contained therein. Air circulating means may be placed in the chamber or car to facilitate the movement of the air to the deodorizer.

It has been found that approximately 3½ ounces of precipitated, uncalcined tricalcium phosphate will efficiently deodorize 9 cubic feet of storage space. In an ordinary household refrigerator, the deodorizer will maintain its efficiency for several months, after which time it may be regenerated merely by opening the container to permit free access of fresh air to the contents or by forcing fresh air through the unit.

Figure 4:
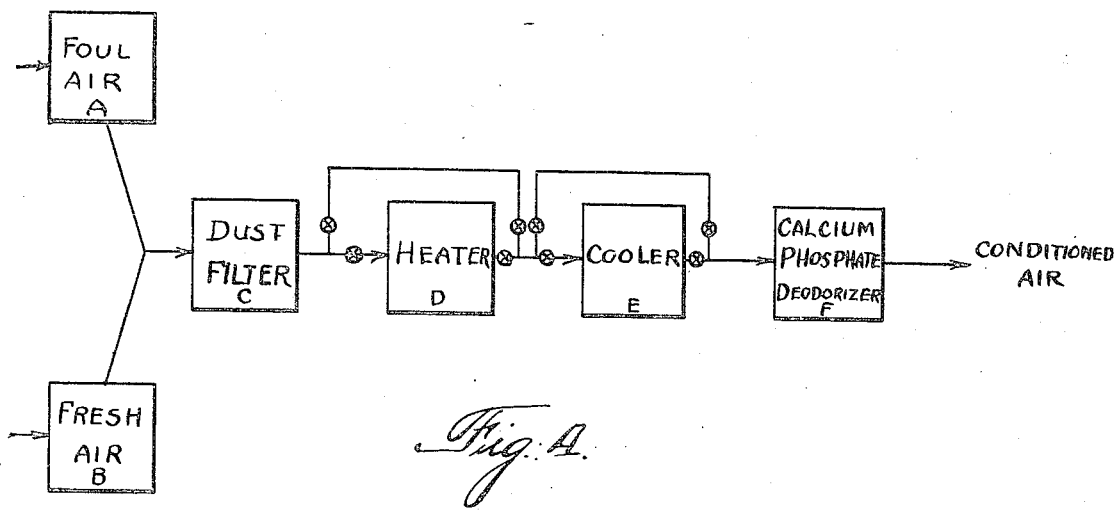
Fig. 4 is a flow diagram of an air-conditioning system.
Figure 5:
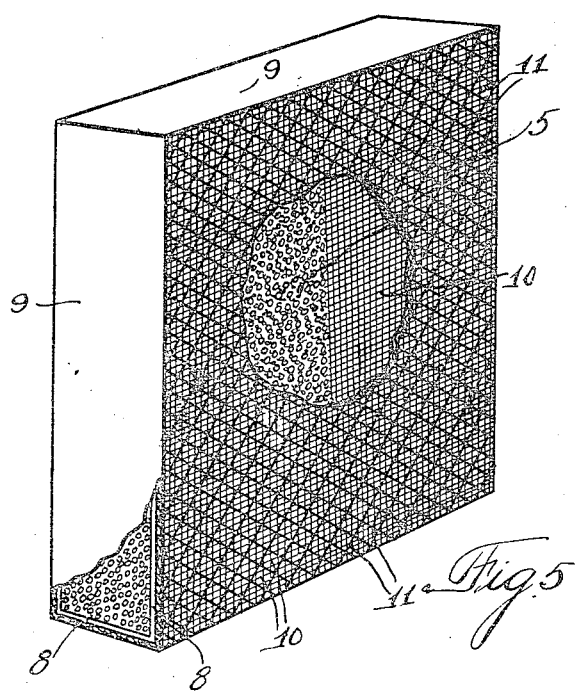
Fig. 5 is a perspective view, partly in section, of a suitable deodorizer unit for use in the air-conditioning system illustrated in Fig. 4.
Figure 6:
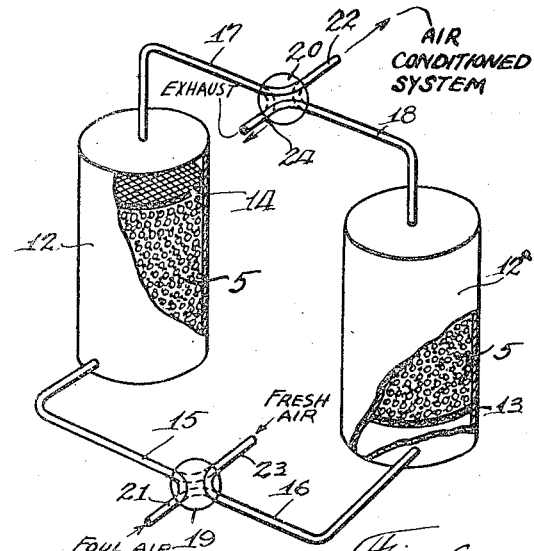
Fig. 6 is a perspective view of a parallel system of deodorizer towers, suitable for use in the conditioning system of Fig. 4.

A suitable air-conditioning system in accordance with the present invention is illustrated in Figs. 4, 5, and 6. Referring now particularly to Fig. 4, foul, or recycle air A, which may be blended with fresh air B, is passed through a dust filter C. The filtered air may then be passed through the heater D (in the winter), or by-passed to the coler E (in the summer). The cooler E may be of any convenient type, such as a spray cooler, for example. From the heater or cooler, or both, the air is passed through the deodorizer unit F, and the air is then conducted to the place of use.

The construction of a suitable deodorizer unit F is more particularly illustrated in Fig. 5. This unit consists of a suitable box-like framework 8, the ends of which consist of sheet material such as sheet metal 9. The sides are covered with a suitable foraminous material such as wire gauze 10, muslin, or the like. If desired, the ends of the structure may be reinforced by a coarser foraminous material 11 such as chicken wire, expanded metal or the like. The unit is filled with precipitated, uncalcined tricalcium phosphate 5 in relatively large particle sizes.

For air-conditioning large structures such as dwellings, theaters, storage houses, factories, and the like, it may be convenient to employ a parallel system of towers such as that shown in Fig. 6. The system comprises a pair of towers 12 and 12a, each of which is provided with a foraminous base support 13, and, if desired, a foraminous structure 14 near the top of the tower to prevent the contents of the tower from being blown therefrom. The towers are connected in parallel by the conduits 15, 16, 17, and 18, four-way valves 19 and 20 being provided so that one of the towers may be used while the other is being regenerated.

During one phase of the operation foul or recycle air will be forced in through the conduit 21, pass through the four-way valve 19, and thence into the tower 12, through the conduit 15. After passing through the mass of precipitated uncalcined tricalcium phosphate 5 disposed within the tower, the deodorized air passes out through the line 17, the four-way valve 20, and thence through the conduit 22 to the air-conditioning system. Simultaneously, air which is free from objectionable odors enters the conduit 23 and passes through the four-way valve 19 and the conduit 16 into the lower portion of tower 12a. The air then flows through the conduit 18, the four-way valve 20, and out to waste through line 24.

When the precipitated, uncalcined tricalcium phosphate in tower 12 is exhausted, the four-way valves 19 and 20 are changed so that the foul air passes through the other tower 12a and fresh air is diverted through the exhausted tower 12. In this manner one tower is being continuously regenerated while the other tower is being used for removing odors. This system is particularly desirable, inasmuch as it permits uninterrupted operation of the air-conditioning system.

In certain cases it may be convenient or desirable to admix with the precipitated, uncalcined form of tricalcium phosphate other materials adapted to facilitate the passage of air through the deodorizing composition. Thus, particles of charcoal, pebbles, Raschig rings, broken earthenware, and the like may be distributed through the body of the precipitated, uncalcined tricalcium phosphate to facilitate the passage of air through the unit.

In certain instances, particularly for Pullman cars and the like where a large proportion of the air is recirculated, it may be desirable to mix, coat, or impregnate the particles of the adsorption medium with an antiseptic or germicidal composition in order to prevent the building up of bacterial content in the air-conditioned space. For this purpose, various germicides may be used, but preferably the materials should be highly toxic to the bacteria, noncorrosive to metals usually employed in engineering equipment, odorless when used in effective concentrations, nonvolatile, nontoxic to man, and stable even on prolonged aeration. For such purposes, ortho- and para-benzyl-phenols may be mentioned by way of example. If desired, these compounds may be dissolved in a suitable medium, such as organic solvents, aqueous alkali, or the like, and the resulting solution may be used to partially coat or impregnate the surface of the adsorption medium in accordance with the present invention.

It will be apparent that many variations may be made in the herein described invention without departing from the spirit and scope thereof. These variations will be readily apparent to anyone skilled in the art. I therefore intend to be limited only in accordance with the following patent claims.

I claim:

1. Process for purifying air, which includes bringing impure air into contact with an uncalcined, precipitated form of tertiary calcium phosphate substantially composed of hydroxyapatite.

2. Process for removing objectionable odors from polluted air, which includes bringing said air into contact with a porous mass of uncalcined, precipitated form of tertiary calcium phosphate containing at least 70% hydroxyapatite.

3. Process for purifying foul air which comprises bringing said air into contact with a porous mass of granular, uncalcined, precipitated tertiary calcium phosphate containing at least 70% hydroxyapatite, said tertiary calcium phosphate being between about four mesh and about eighty mesh in particle size.

4. In a gas-absorbing unit including a container having a foraminous wall adapted to permit the free access of air thereinto, a gas-adsorption composition comprising an uncalcined, precipitated form of tertiary calcium phosphate substantially composed of hydroxyapatite.

5. In an odor-adsorbing unit including a container having a foraminous wall adapted to permit the passage of air therethrough, an odor adsorbing composition comprising a granular, uncalcined precipitated form of tertiary calcium phosphate composed of at least 70% hydroxyapatite.

6. In an odor-absorbing unit including a container having a foraminous wall adapted to permit the passage of air therethrough, an odor-adsorbing composition comprising a granular, uncalcined precipitated form of tertiary calcium phosphate composed of at least 70% hydroxyapatite, said tertiary phosphate being between about four mesh and about eighty mesh in particle size.

HAROLD JAY SHAMES.